(12) United States Patent
Chen

(10) Patent No.: US 7,251,943 B2
(45) Date of Patent: Aug. 7, 2007

(54) SEMICONDUCTOR BASED AIR CONDITIONING DEVICE

(76) Inventor: Chuan-Sheng Chen, Fl. 12, No. 137, Sec. 4, JenAi Road, Taipei 104 (TW)

( * ) Notice: Subject to any disclaimer, the term of this patent is extended or adjusted under 35 U.S.C. 154(b) by 160 days.

(21) Appl. No.: 11/249,445

(22) Filed: Oct. 14, 2005

(65) Prior Publication Data

US 2007/0012049 A1    Jan. 18, 2007

(30) Foreign Application Priority Data

Jul. 15, 2005    (TW) .............................. 94212020 U

(51) Int. Cl.
*F25B 21/02*    (2006.01)
(52) U.S. Cl. ........................................ 62/3.7; 62/259.2
(58) Field of Classification Search .................. 62/3.2, 62/3.6, 3.7, 259.2
See application file for complete search history.

(56) References Cited

U.S. PATENT DOCUMENTS

| | | | |
|---|---|---|---|
| 3,757,530 A * | 9/1973 | Doyle et al. .................. | 62/117 |
| 6,351,951 B1 * | 3/2002 | Guo et al. ..................... | 62/3.7 |
| 6,401,461 B1 * | 6/2002 | Harrison et al. ............. | 62/3.61 |
| 6,574,967 B1 * | 6/2003 | Park et al. .................... | 62/3.3 |

* cited by examiner

*Primary Examiner*—Melvin Jones
(74) *Attorney, Agent, or Firm*—Leong C. Lei

(57) ABSTRACT

The present invention mainly utilizes a specialized semiconductor ship, the so-called thermoelectric cooling chip, for producing the coldness. A cooling circulating member and a heat dissipating member are configured at the two sides of the thermoelectric cooling chip. The coldness produced by the thermoelectric cooling chip is delivered by a cold conduction plate and cooling pipes, and is stored in fins of the cooling circulating member. A temperature controller determines a desired temperature and the coldness stored in the fins are blown out as cool air by a fan. Similarly, the heat produced by the chip is dissipated by the heat dissipating member. As such, the present invention could reach the desired temperature within a short period of time without the conventional compressor. The present invention therefore is easier to install and transport, consumes less power, and produces almost no noise and pollution to the environment.

2 Claims, 2 Drawing Sheets

SEMICONDUCTOR BASED AIR CONDITIONING DEVICE

BACKGROUND OF THE INVENTION (a) Technical Field of the Invention

The present invention generally relates to air conditioning devices and, more particularly, to an air conditioning device utilizing a thermoelectric cooling chip.

(b) Description of the Prior Art

Traditional air conditioners and refrigerators utilize compressor and refrigerant to produce the required low temperatures. The use of the compressor has quite a few disadvantages. The compressor is heavy and bulky, making the installation and transportation very inconvenient. The compressor also consumes a lot of energy, in addition to the annoying noise it produces. On the other hand, the refrigerant is also not environmentally friendly.

SUMMARY OF THE INVENTION

The primary purpose of the present invention is to provide a novel air conditioning device to replace the traditional air conditioners and refrigerators, which not only consumes less energy but also is environmentally friendly. The present invention mainly utilizes a specialized semiconductor chip, thermoelectric cooling chip, for producing the coldness. A cooling circulating member and a heat dissipating member are configured at the two sides of the thermoelectric cooling chip. The coldness produced by the thermoelectric cooling chip is delivered by a cold conduction plate and cooling pipes, and is stored in fins of the cooling circulating member. A temperature controller determines a desired temperature and the coldness stored by the fins are blown out as cool air by a fan. Similarly, the heat produced by the chip is dissipated by the heat dissipating member. As such, the present invention could reach the desired temperature within a short period of time without the conventional compressor. The present invention therefore is easier to install and transport, consumes less power, and produces almost no noise and pollution to the environment.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
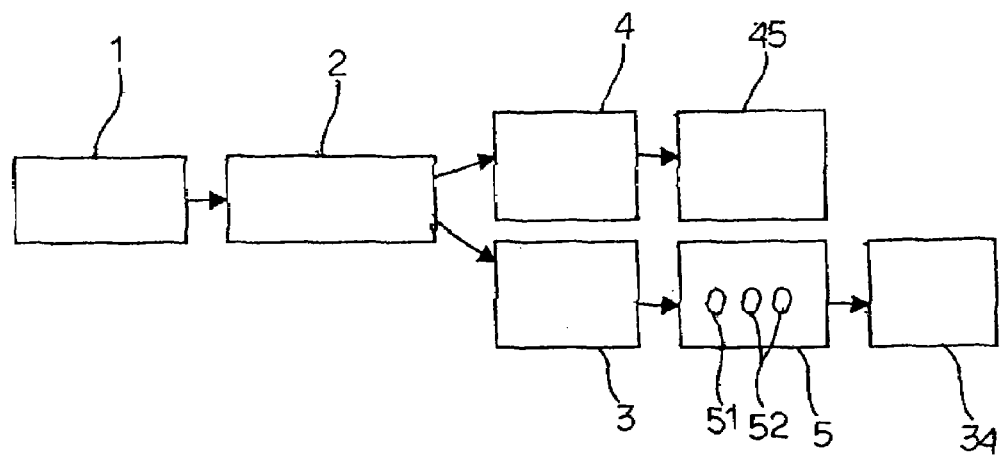
FIG. 1 is a functional diagram showing the various components of the present invention.
Figure 2:
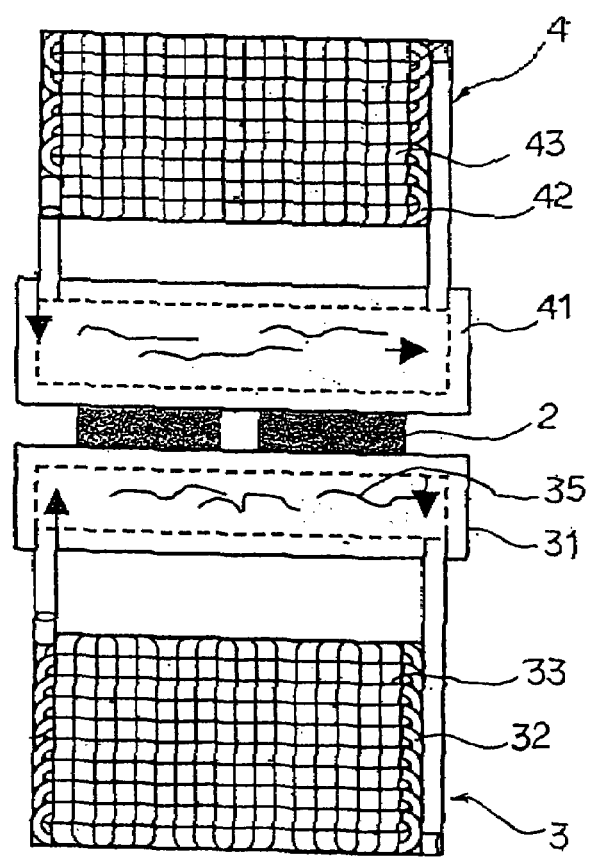
FIG. 2 is a schematic diagram showing the various components of the present invention.
Figure 3:
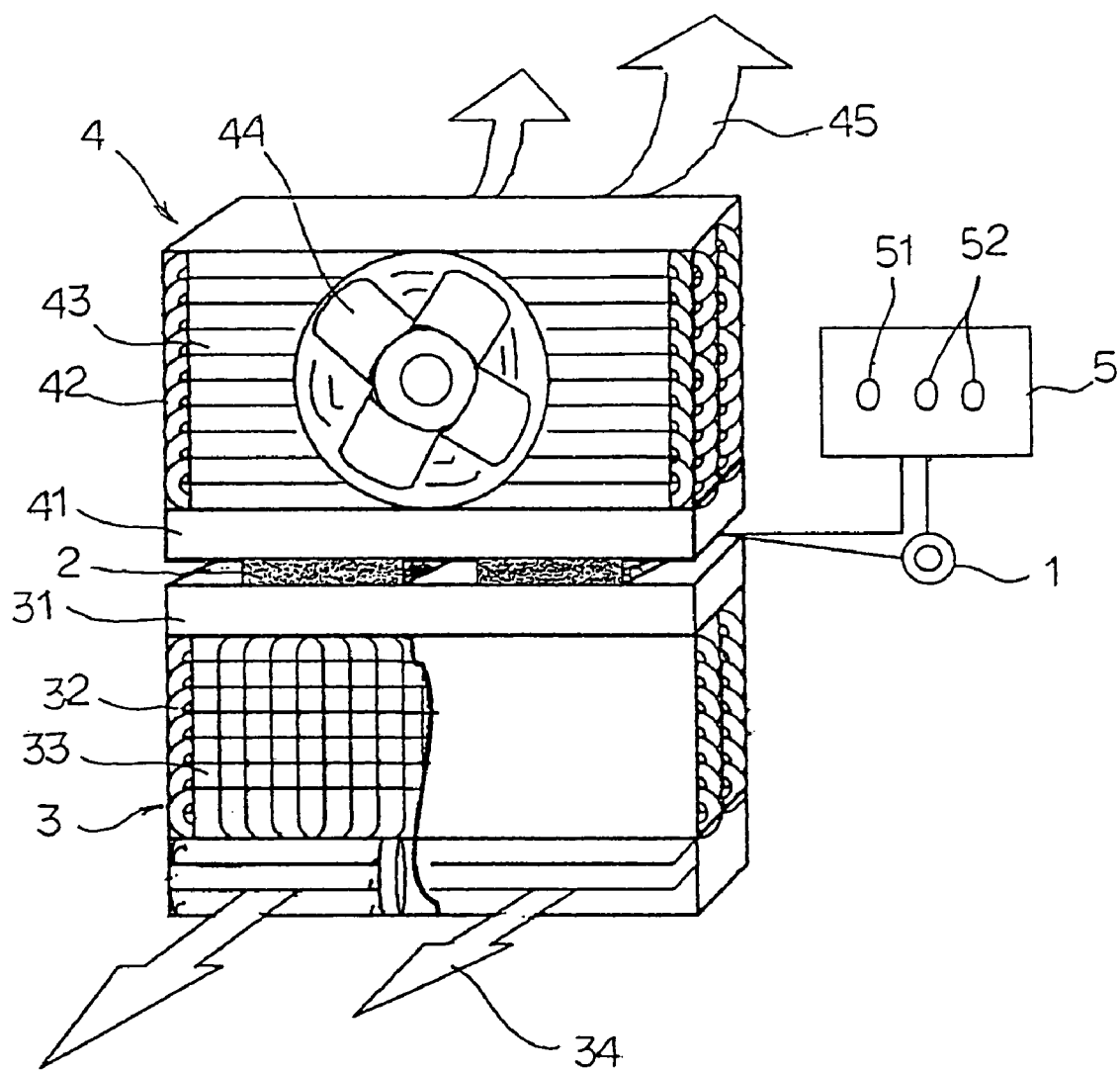
FIG. 3 is a perspective schematic diagram showing the appearance of the present invention.

As shown in FIGS. 1~3, the present invention mainly contains a power supply member 1, at least a thermoelectric cooling chip 2, a cooling circulating member 3, a heat dissipating member 4, and a temperature controller 5. The cooling circulating member 3 and the heat dissipating member 4 are fixedly installed on a cold production surface and a heat production surface of the thermoelectric cooling chip 2, respectively. The cooling circulating member 3 contains a cold conduction plate 31, cooling pipes 32, and fins 33. The heat dissipating member 4, on the other hand, contains a heat conduction plate 41, heat dissipating pipes 42, fins 43, and a fan 44. The coldness produced by the thermoelectric cooling chip 2 is conducted to and stored in the fins 33 via the cold conduction plate 31 and the cooling pipes 32. A desired temperature is set by temperature up/down buttons 52 and a temperature fixing button 51 of the temperature controller 5, via a wired or wireless connection. Then the coldness stored in the fins 33 is blown out by the fan 44 as cool air 34. The heat produced by the thermoelectric cooling chip 2 is dissipated out of the present invention as hot air 45 by the heat conduction plate 41, heat dissipating pipes 42, fins 43, and the fan 44. As such, the present invention could reach the desired temperature within a short period of time.

The cold and heat conduction plates 31 and 41 are usually made of metallic materials having high thermal conductivity such as copper or aluminum. The cold and heat conduction plates 31 and 41 could also be made into hollow containers having an appropriate circulating fluid 35 inside. Without the conventional compressor, the present invention could achieve the desired air-conditioning effect simply based on the thermoelectric cooling chip, the cooling circulating member, and the heat dissipating member. The thermoelectric cooling chip could produce a temperature as low as $-5°$ C. After the conduction and circulation, a temperature as low as $5°$ C.~$10°$ C. could still be maintained, which is well within the requirement for air conditioning purpose.

The present invention is environmentally friendly if the conventional refrigerant is not used as the circulating fluid 35. In addition, without the use of the compressor, the present invention could provide a power saving up to 60%~70%. In addition, the present invention is much lighter in weight and smaller in form factor as no bulky compressor is required. The present invention is therefore easier in installation and transportation.

Please note that the foregoing one or more thermoelectric cooling chip, the cooling circulating member, and the heat dissipating member could be combined into a basic module and, depending on the required air conditioning capacity for larger room or warmer environment, one or more such basic module could be integrated together to form a more powerful air conditioning device.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A semiconductor-based air conditioning device comprising
   at least a thermoelectric cooling chip;
   a cooling circulating member comprising a cold conduction plate, a plurality of cooling pipes, and a plurality of fins, said cooling circulating member fixedly installed on a cold production surface of said thermoelectric cooling chip;
   a heat dissipating member comprising a heat conduction plate, a plurality of heat dissipating pipes, a plurality of fins, and a fan, said heat dissipating member fixedly installed on a heat production surface of said thermoelectric cooling chip; and
   a temperature controller for setting a desired temperature by temperature control buttons of said temperature controller via a wired or wireless connection to said air conditioning device;
   wherein the coldness produced by said thermoelectric cooling chip is conducted to and stored in said fins via said cold conduction plate and said cooling pipes; the coldness stored in said fins is blown out by said fan as cool air according to said desired temperature; the heat produced by said thermoelectric cooling chip is dissipated out as hot air by said heat conduction plate, said heat dissipating pipes, said fins, and said fan.

2. The semiconductor air conditioning device according to claim 1, wherein said air conditioning device comprises additional sets of said thermoelectric cooling chip, said cooling circulating member, and said heat dissipating member.

* * * * *